Jan. 13, 1959   C. C. SCHOW   2,868,538
TRACTION CONTROLLING MEANS
Filed Sept. 23, 1957
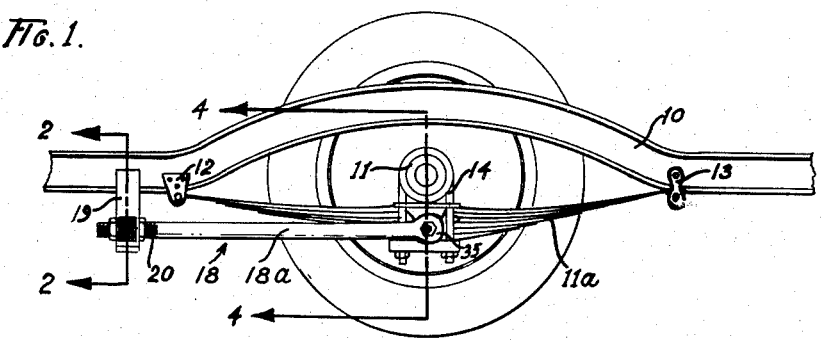
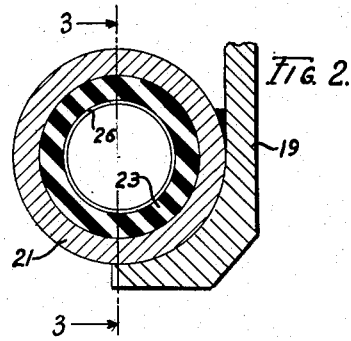
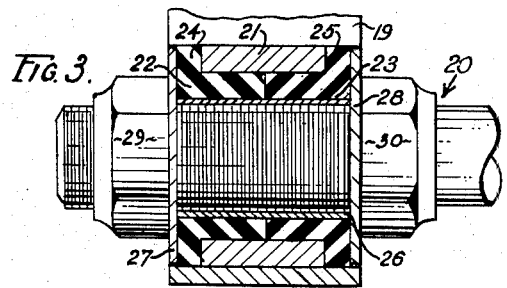
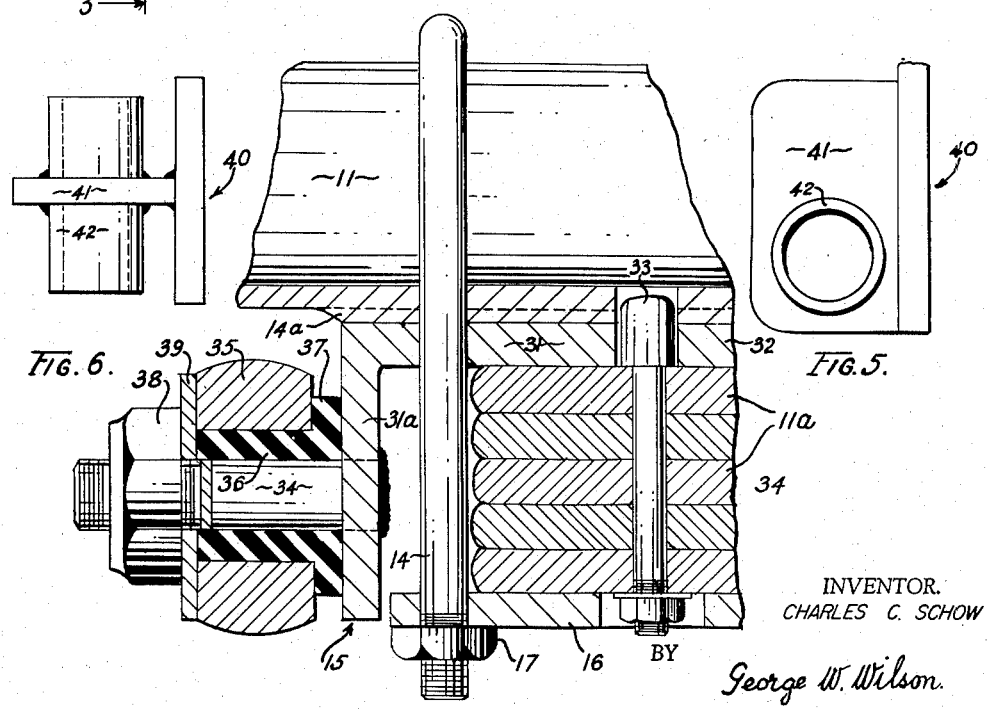
INVENTOR.
CHARLES C. SCHOW
BY
George W. Wilson.
HIS ATTORNEY

United States Patent Office 2,868,538
Patented Jan. 13, 1959

2,868,538

TRACTION CONTROLLING MEANS

Charles C. Schow, Bellflower, Calif.

Application September 23, 1957, Serial No. 685,628

5 Claims. (Cl. 267—67)

My invention relates to means for controlling both the deflection and forward and backward movement of resilient suspension systems such as the semi-elliptical leaf springs commonly provided for automatic vehicles and thereby controlling the traction exerted by the wheels with the ground.

When a truck, for instance, is travelling even at moderate speeds over a rough road considerable wear is imposed on the transmission caused by bouncing of the wheels as they strike bumps, fall into pot holes or strike large stones even if shock absorbers are fitted, since the forces acting on the springs of the vehicle are severe and cause deflections of the springs which can only be partly controlled by shock absorbers.

Such springs are also subjected to variation in the torque of the engine because of the tendency to twist the rear axle housing which causes a small forward or backward movement of each spring as permitted by its mounting, since the center of the springs are secured solidly to the housing.

It is the general object of my invention to provide means which are effective to dampen undesirably violent deflections or other movement of spring suspension systems, particularly of the semi-elliptical leaf spring system which is almost universally fitted to automobiles and trucks.

Leaf springs at the rear wheels of automobiles and trucks are commonly secured at their forward ends to a bracket rigidly fixed to the vehicle frame, the rear end of the spring being connected to a swinging link pivoted to the frame to the rear of the wheel rear axle, because of this connection of the rear springs of the rear axle housing to the frame, there is a constant slight forward and backward movement of the rear axle housing and it is an object of this invention to provide means acting resiliently both to absorb some of this forward and backward movement as well as to dampen the vertical movement of the springs thus relieving some of the wear on the universal joints incorporated to provide for the movements of the rear axle housing in the transmission of automotive vehicles.

It is another object to provide a simple and rugged construction of damping elements for achieving the objects set forth and one which may be fitted to different types of automotive vehicles in a minimum time.

It is a further object of the invention to provide a dampening means for the movements of leaf springs of the semi-ellipitcal type which means comprise a small number of parts and in which the parts subject to most wear can readily be replaced at small cost.

It is another object of the invention to arraange dampening means for automotive vehicle leaf springs arranged for maximum effectiveness relative to the springs and enabling more resilient springs to be fitted to the vehicle than would otherwise be the case with a resulting gain in comfortable riding qualities of the vehicle.

Still further objects and features of the invention will hereinafter appear from the following specification read with reference to the accompanying illustrative drawings.

In the drawings:

Figure 1 is a side elevation of a back wheel of a heavy truck having a somewhat stiff spring as is needed to carry a heavy load, and showing the traction control means of my invention installed on the vehicle;

Figure 2 is a section on the line 2—2 in Figure 1 drawn on a larger scale;

Figure 3 is a section on the line 3—3 in Figure 2;

Figure 4 is a section on the line 4—4 in Figure 1 but drawn on a larger scale than Figures 2 and 3;

Figure 5 is a fragmentary side elevation of a modified form of bracket holding the front end of the traction control means of my invention drawn on a smaller scale; and Figure 6 is a top plan view of the parts shown in Figure 5.

Referring now to Figure 1 the numeral 10 indicates the frame of a truck having the rear axle housing 11 connected to the frame by a heavy semi-elliptical leaf spring 11a secured to a stationary bracket 12 mounted on the frame at its forward end, to a swinging shackle 13 mounted on the frame at its rearward end. The spring 11a is clamped to the axle housing at its center by U bolts 14 passing around the axle housing, through the horizontal top plate of an angle clamp 15, bottom plate 16, and nuts 17 on the ends of the U bolts tightened up against a bottom plate. The housing is fitted as is standard practice with spring pads 14a so that the horizontal plate of the angle clamp is rigidly clamped between flat surfaces.

The device of my invention is indicated generally by the numeral 18 and comprises a heavy steel rod 18a of about ⅞ inch in diameter secured in a horizontal position, when the loaded truck is standing, at the front end to a bracket 19 secured, as by welding, to the frame of the truck preferably ahead of the front bracket 12 to which the spring is secured, and with the rear end of the rod located at about the middle of the depth of spring 11a.

The traction controlling device of my invention derives its effectiveness from the construction of the means by which it is connected between the vehicle frame and axle housing as described later.

The forward end 20 of the rod 18 as indicated in Figure 3 is threaded and elastically secured in bracket 19 as shown in Figures 2 and 3. The bracket 19 is of angular or "L" shape secured to the frame 10 by its longer side and carrying a housing 21 secured in the angle between the longer and shorter sides.

Two thick rubber bushings 22, 23 preferably made of tough oil resistant synthetic rubber are inserted between the wall of the housing and the rod 18a, each sleeve having flanged ends 24, 25 and having an interior diameter rather larger than the rod 18a.

A steel sleeve 26 is positioned over the threaded rod in the housing between the rod and the sleeves, and is shorter than the combined axial length of the sleeves when they are in untensioned condition.

Heavy washers 27 and 28 are positioned on the rod 18a and against the end faces of the sleeves 22 and 23, and lock nuts 29 and 30 are positioned on the threaded end 20 of rod 18a and are tightened up to apply pressure to the rubber sleeves until the washers are drawn up against the ends of the sleeve 26.

The rear end of the rod 18a is secured to the angle bracket 15 having its horizontal plate 31 clamped between the top of the leaf spring 11a and the lower surface of the rear axle housing as shown in Figure 4. The plate 31 is provided with a hole 32 which receives the head 33 of the center bolt 34 used to retain the leaves of leaf springs in correct position, the horizontal plate 31 is thus securely held in position at the center of the leaf spring so that it cannot work out of position and in effect is part of the rear axle housing and partakes of any movement of the housing.

The vertical plate 31a of the bracket 15 is provided with a mounting stud 34 securely welded in place. The stud 34 is threaded at its outer end only and an eye formed in the enlarged head 35 of rod 18a is mounted on the stud with a rubber bushing 36 surrounding the pin 34. The bushing 36 is shown with a single flange 37 positioned between the head 35 and the bracket plate 31a but obviously separate bushings each with an end flange may be used if preferred.

The head 35 is held on stud 34 by a lock nut 38 screwed on the stud 34 and transmitting pressure to the rubber bushing 36 through washer 39.

The modified form 40 of the bracket holding the forward end of the rod 18a shown in Figures 5 and 6 comprises a piece of T angle material welded by its head to the vehicle frame and having its flange 41 bored to receive a length of pipe 42 welded to the flange and providing the barrel member of the securing means in which the other components of the resiliently securing means are arranged as previously described.

The traction controlling member, when the vehicle leaf spring is under load on a level road, will not be called on to respond to any material deflection of the spring but will undergo axial movement as variations in the torque exerted by the motor is transmitted to the rear axle housing and springs and therefore to the traction controlling member to cause slight axial movement of the rod 18a which movement is resiliently resisted by the resilient bushings in the housing mounted on the bracket secured to the vehicle frame.

Should the wheel drop suddenly into a depression in the road, the radius of curvature of the spring will be decreased thus causing both an axial movement of the rigid rod member 18a and a tilting movement in a vertical plane, of the axis of the rigid rod in the housing, both of which movements will be resiliently resisted.

Should the springs be momentarily flattened by downward movement of the truck body, the radius of curvature of the spring will be increased thus again causing axial movement of the rigid member and titlting of the axis of the member in the housing which movements are yieldably resisted as before.

The yieldable mounting of the end of the rigid rod on the bracket secured between the rear axle housing and the vehicle spring will enable this end of the rigid member to cooperate in dampening the movements of the rigid member and thus control the traction of the rear wheels.

The pressure applied to the resilient bushings mounted in the housing carried by the fixed bracket member mounted on the frame, and also mounted between the pivot and apertured end of the rigid member, may be adjusted by the locknuts mounted on said rigid member and on the pivot member 34 but the rubber bushings cannot be overstressed because of the limit provided by the steel sleeve 26 and unthreaded portion of stud 34.

A wide range of adjustment to vehicles having leaf springs of various lengths is provided through the use of the locknuts on the rigid member while the pivoted end of the rigid member may be located at about the mid point of the depth of the spring by utilizing a bracket having a depending arm of the proper length.

Preferred embodiments of my invention have been specifically described herein by way of illustrative example but not as limitative of the scope of the invention which is defined by the appended claims.

What I claim is:

1. Traction controlling device for semi-elliptical leaf springs of automotive vehicles, comprising: a rigid longitudinal member; a bracket secured to the frame of the vehicle; a barrel mounted on said bracket to surround a cylindrical threaded end of said rigid longitudinal member, said barrel being of greater diameter than said cylindrical end; bushing means of resilient material fitted on said cylindrical end and filling the space between the surface of said cylindrical end and the inner surface of said barrel; metal sleeve means mounted between the surface of the cylindrical end of the rigid member and the inner surface of said bushing means; means preventing longitudinal displacement of the resilient bushing means with respect to the barrel; means mounted on said rigid member at each side of the barrel and transmitting axial movement of said rigid member as a force applied to said bushing means; and means pivotally securing the other end of said longitudinal member to the leaf spring at about the mid-point of the length thereof.

2. Traction controlling means as set forth in claim 1 and in addition comprising flanged ends on said bushings positioned against the ends of said barrel, metal washers on the cylindrical threaded end of said rigid longitudinal member and bearing against said flanged ends of the bushings; and nuts on said threaded end tightened up against said washers.

3. Traction controlling means as set forth in claim 2 in which said metal sleeve means are given a length such that they serve as stops to limit the degree of compression to which said resilient bushings are subjected by adjustment of the nuts toward one another on said threaded end of the rigid longitudinal member.

4. Traction controlling means as set forth in claim 2 and in which the means securing one end of the rigid longitudinal member comprises: a bracket rigidly secured to the rear axle housing at the point of attachment of the semi-elliptical spring to said housing; a pivot pin carried by said bracket and extending horizontally at about the middle of the depth of said leaf spring; an eye formed at the end of said rigid member of greater internal diameter than the external diameter of said pin; a resilient flanged bushing positioned on said pin within the eye of said rigid member; and means mounted on a threaded portion of said pin to compress said resilient bushing.

5. Traction controlling means as set forth in claim 4 and in which said bracket comprises a horizontal plate secured between the spring pad on the rear axle housing and the top leaf of said spring by the bolts clamping the spring to the housing, said plate being apertured to receive the center vertical bolt of the spring; and a vertical plate integral with the horizontal plate extending alongside the spring and on which said pivot pin is mounted, whereby said bracket partakes of all movements of said housing and transmits all movements thereof to said longitudinal rigid member.

References Cited in the file of this patent

UNITED STATES PATENTS

| | | |
|---|---|---|
| 1,602,466 | Swett | Oct. 12, 1926 |
| 2,191,941 | Reid | Feb. 27, 1940 |
| 2,215,826 | Crane | Sept. 24, 1940 |
| 2,699,935 | Meier | Jan. 18, 1955 |

FOREIGN PATENTS

| | | |
|---|---|---|
| 406,554 | Great Britain | Mar. 1, 1934 |